United States Patent
White et al.

(10) Patent No.: US 11,758,844 B2
(45) Date of Patent: Sep. 19, 2023

(54) FORWARD-LOOKING PERCEPTION AND MACHINE CONTROL DURING CROP HARVESTING OPERATIONS

(71) Applicant: Deere & Company, Moline, IL (US)

(72) Inventors: Ryan R. White, Polk City, IA (US); Ashraf Qadir, Ankeny, IA (US)

(73) Assignee: Deere & Company, Moline, IL (US)

( * ) Notice: Subject to any disclaimer, the term of this patent is extended or adjusted under 35 U.S.C. 154(b) by 668 days.

(21) Appl. No.: 16/823,884

(22) Filed: Mar. 19, 2020

(65) Prior Publication Data

US 2021/0289701 A1  Sep. 23, 2021

(51) Int. Cl.
*A01D 41/127* (2006.01)
*G06T 7/60* (2017.01)
*G06F 18/2431* (2023.01)

(52) U.S. Cl.
CPC ....... *A01D 41/127* (2013.01); *G06F 18/2431* (2023.01); *G06T 7/60* (2013.01); *G06T 2207/30188* (2013.01)

(58) Field of Classification Search
CPC .................. G06V 20/188; G06V 20/68; G06T 2207/30188; G06T 7/136; G06T 2207/10016

See application file for complete search history.

(56) References Cited

U.S. PATENT DOCUMENTS

| 2014/0012732 | A1* | 1/2014 | Lindores | A01B 79/005 |
| | | | | 705/37 |
| 2016/0106038 | A1* | 4/2016 | Boyd | A01D 34/006 |
| | | | | 56/10.2 J |
| 2016/0157428 | A1* | 6/2016 | Pitzer | A01D 46/30 |
| | | | | 701/50 |
| 2016/0302351 | A1* | 10/2016 | Schildroth | A01B 79/005 |
| 2017/0118915 | A1* | 5/2017 | Middelberg | A01D 69/03 |

(Continued)

FOREIGN PATENT DOCUMENTS

| CN | 109588107 A | * | 4/2019 | ........ A01D 41/1278 |
| CN | 109634277 A | * | 4/2019 | ............ A01D 45/00 |

(Continued)

OTHER PUBLICATIONS

Benson et al., Machine Vision-based Guidance System for Agricultural Grain Harvesters using Cut-edge Detection, 2003, (AE) Automation and Emerging Technologie, Biosystems Engineering (2003) 86 (4), pp. 389-398, doi:10.1016/j.biosystemseng.2003.07.002.*

(Continued)

*Primary Examiner* — Guillermo M Rivera-Martinez
(74) *Attorney, Agent, or Firm* — Christopher J. Volkmann; Kelly, Holt & Christenson, PLLC

(57) ABSTRACT

A computer-implemented method includes obtaining harvest data indicative of a prior harvesting operation on a field, identifying a region of the field having already-harvested crop plants based on the harvest data, detecting a characteristic of crop plants in a field in a path of an agricultural harvesting machine in a direction of travel, generating, based on the detected characteristic, a height metric representing a height of the crop plants on a particular area of the field, and generating a control signal to control the agricultural harvesting machine based on the height metric and the identified region.

20 Claims, 14 Drawing Sheets

(56) References Cited

U.S. PATENT DOCUMENTS

| | | | |
|---|---|---|---|
| 2018/0070527 A1* | 3/2018 | Richt | A01B 79/005 |
| 2018/0108123 A1* | 4/2018 | Baurer | G06V 20/56 |
| 2018/0196441 A1 | 7/2018 | Muench et al. | |
| 2018/0325014 A1* | 11/2018 | Debbaut | G05D 1/101 |
| 2018/0376128 A1* | 12/2018 | Jensen | H04N 13/289 |
| 2019/0150357 A1* | 5/2019 | Wu | G06T 7/73 |
| 2019/0259108 A1* | 8/2019 | Bongartz | A01G 7/045 |
| 2019/0285422 A1* | 9/2019 | Opitsch | G01C 21/3826 |
| 2019/0289786 A1* | 9/2019 | Prystupa | A01D 41/1277 |

FOREIGN PATENT DOCUMENTS

| | | |
|---|---|---|
| EP | 3011824 A1 | 4/2016 |
| EP | 3085221 A1 | 10/2016 |
| EP | 3165062 A1 | 5/2017 |
| WO | WO2013120062 A1 | 8/2013 |
| WO | WO2019140512 A1 | 7/2019 |

OTHER PUBLICATIONS

Kise et al., A Stereovision-based Crop Row Detection Method for Tractor-automated Guidance, 2005, Biosystems Engineering, vol. 90, Issue 4, pp. 357-367, doi.org/10.1016/j.biosystemseng.2004.12.008.*

Ollis et a'., "First results in vision-based crop line tracking", Proceedings of the 1996 IEEE International Conference on Robotics and Automation Minneapolis, Minnesota—Apr. 1996, pp. 951-956.*

Application and Drawings for U.S. Appl. No. 16/380,531, filed Apr. 10, 2019, 46 pages.

Application and Drawings for U.S. Appl. No. 16/380,564, filed Apr. 10, 2019, 55 pages.

Extended European Search Report and Written Opinion issued in European Patent Application No. 21157665.7, dated Sep. 23, 2021, in 08 pages.

* cited by examiner

US 11,758,844 B2

FORWARD-LOOKING PERCEPTION AND MACHINE CONTROL DURING CROP HARVESTING OPERATIONS

FIELD OF THE DESCRIPTION

The present description generally relates to agricultural machines. More specifically, but not by limitation, the present description relates to control of an agricultural harvesting machine using a geometric image classifier and harvest map.

BACKGROUND

Agricultural harvesters, such as combines or windrowers, travel through fields of agricultural crop harvesting the crop. In one common arrangement, agricultural harvesting heads extend forward from the agricultural harvester to engage the plant stalks, sever them, and carry the severed crop into the body of the agricultural harvester, itself, for processing.

In agricultural harvesters, the throughput (rate of crop moving through the machine) is dependent on the forward ground speed of the harvester and the density of the crop being harvested. Some machine settings can be set, assuming a throughput, and machine speed is then varied, as the operator observes differences in crop density, to maintain the desired throughput.

Some current systems automatically adjust the forward ground speed of the harvester in an attempt to maintain a desired crop throughput. For instance, some systems have attempted to use a priori data (such as aerial imagery of a field) in order to generate a predictive yield map, which predicts yields at different geographic locations in the field being harvested. This can be done by attempting to identify the crop density based on an image classifier classifying images of the field in a pass of the harvester.

The discussion above is merely provided for general background information and is not intended to be used as an aid in determining the scope of the claimed subject matter.

SUMMARY

A computer-implemented method includes obtaining harvest data indicative of a prior harvesting operation on a field, identifying a region of the field having already-harvested crop plants based on the harvest data, detecting a characteristic of crop plants in a field in a path of an agricultural harvesting machine in a direction of travel, generating, based on the detected characteristic, a height metric representing a height of the crop plants on a particular area of the field, and generating a control signal to control the agricultural harvesting machine based on the height metric and the identified region.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 7-1 illustrates an example field being harvested by a harvesting machine.

FIG. 7-2 illustrates an example field being harvested by a harvesting machine.

DETAILED DESCRIPTION

As discussed above, some current harvester systems attempt to use a priori data (such as aerial images) in order to generate a predictive map that can be used to control the harvester. By way of example, there has been a great deal of work done in attempting to generate a predictive yield map for a field, based upon vegetation index values generated from aerial imagery. Such predictive yield maps attempt to predict a yield at different locations within the field. The systems attempt to control a combine harvester (or other harvester) based upon the predicted yield.

Also, some systems attempt to use forward-looking perception systems, which can involve obtaining optical images of the field, forward of a harvester in the direction of travel. A yield can be predicted for the area just forward of the harvester, based upon those images. This is another source of a priori data that can be used to generate a form of a predictive yield map.

All of these types of systems can present difficulties.

For instance, in systems that utilize image processing to predict yield of the field in a pass of the harvester, it can be difficult to distinguish between standing crop and areas having crop stubble (i.e., areas that have already been harvested). Some systems attempt to address this issue using an image classifier trained to distinguish between such area. However, such image classifiers often require extensive training with large amounts of training data, which requires large amounts of processing bandwidth and time. Even so, such classifiers can be inaccurate.

In contrast, the present description relates to control of an agricultural harvesting machine using a geometric image classifier and harvest map. In described examples, the system utilizes a geometric classifier to distinguish between field areas having standing crop and field areas having non-standing crop (downed crop or crop stubble). This information is fused with harvest map(s) to determine if the areas having non-standing crop are areas that have already been harvested (and thus are areas of crop stubble) or are areas of downed crop. The geometric classifier is configured to measure the height of the crop relative to the ground, which can be used to predict the yield (or mass flow) in the path of the harvester, to control various subsystems on the harvester (e.g., to achieve a desired throughput).

Figure 1:
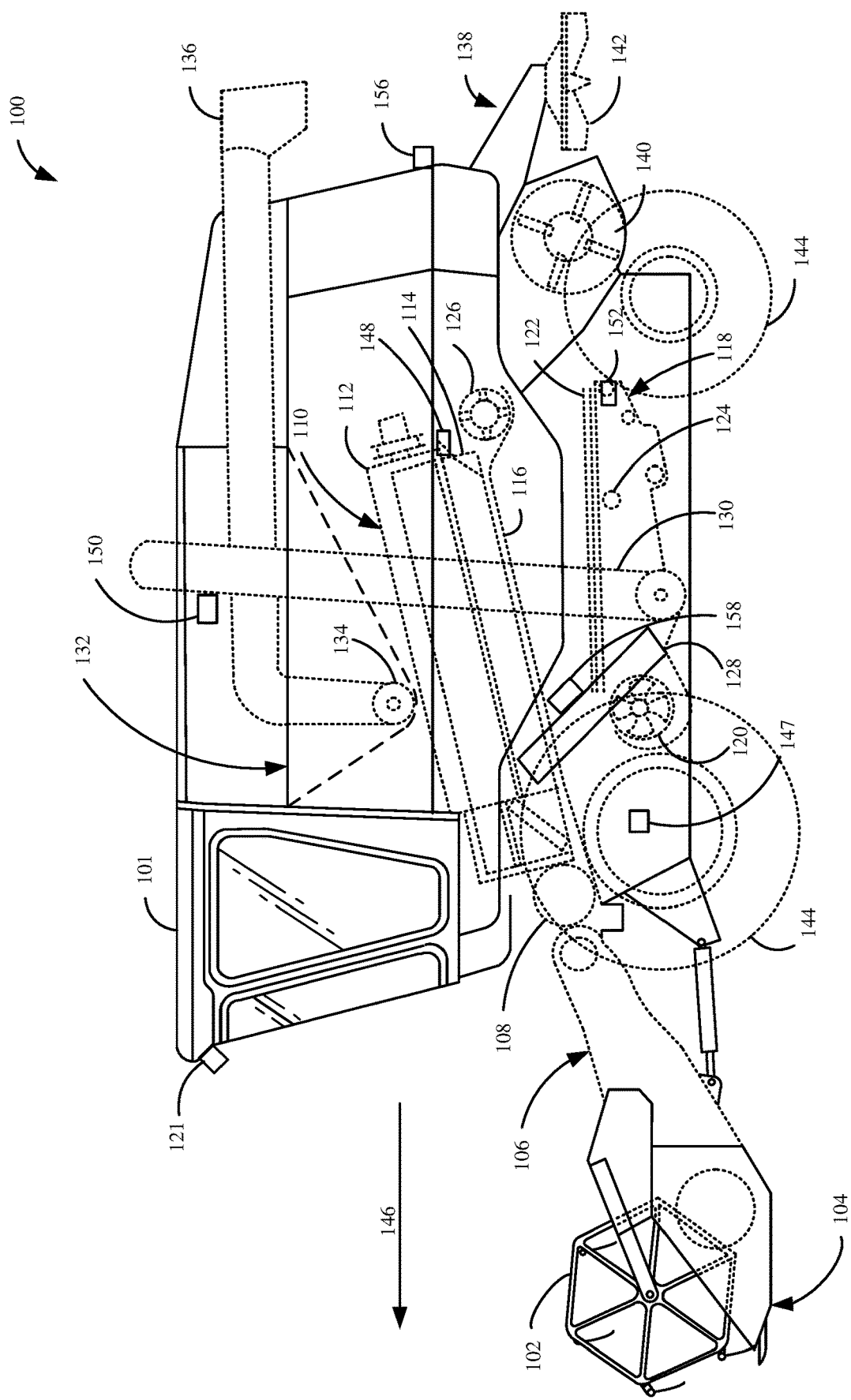
FIG. 1 is a partial pictorial, partial schematic, illustration of one example of an agricultural harvesting machine.

FIG. 1 is a partial pictorial, partial schematic, illustration of an agricultural harvesting machine 100 (also referred to as a "harvester" or "combine"). It can be seen in FIG. 1 that machine 100 illustratively includes an operator compartment 101, which can have a variety of different operator interface mechanisms, for controlling machine 100, as will be discussed in more detail below. In one example, machine 100 is fully autonomous and may not have an operator compartment. Machine 100 can include a set of front-end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, machine 100 can include a separator 116 that includes a separator rotor. Machine 100 can include a cleaning subsystem (or cleaning shoe) 118 that, itself, can include a cleaning fan 120, chaffer 122 and sieve 124. The material handling subsystem in machine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Machine 100 can further include a residue subsystem 138 that can include chopper 140 and spreader 142. Machine 100 can also have a propulsion subsystem that includes an engine that drives ground engaging wheels 144 or tracks, etc. It will be noted that machine 100 may also have more than one of any of the subsystems mentioned above (such as left and right cleaning shoes, separators, etc.).

In operation, and by way of overview, machine 100 illustratively moves through a field in the direction indicated by arrow 146. A forward-looking sensor 121 is mounted on the front of machine 100 and senses characteristics of crop in front of the machine 100. In one example, sensor 121 is an image capture sensor that captures images (e.g., video feed, series of still images, etc.) of an area forward of header 102. The video feed or image(s) can be used to show (e.g., on a display device in operator compartment 101) a view forward of operator compartment 101, such as showing header 102 and/or the crop in front of header 102. The image(s) can be used to identify a volume of crop to be engaged by header 102. This can be used to automatically increase or decrease the ground speed of machine 100 to maintain a desired crop throughput. This is described in greater detail below.

As machine 100 moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in machine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, machine 100 can include ground speed sensor 147, one or more separator loss sensors 148, a clean grain camera 150, one or more cleaning shoe loss sensors 152, forward looking camera 154, rearward looking camera 156, a tailings elevator camera 158, and a wide variety of other cameras or image/video capture devices. Ground speed sensor 146 illustratively senses the travel speed of machine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed. In one example, optical sensor(s) capture images and optical flow is utilized to determine relative movement between two (or more) images taken at a given time spacing.

Cleaning shoe loss sensors 152 illustratively provide an output signal indicative of the quantity of grain loss. In one example, this includes signal(s) indicative of the quality of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. In one example, sound-based sensors across an area of the cleaning shoe and/or rotor can be utilized to obtain a count of grain strikes and a spatial distribution associated with the count. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

Cameras 150, 156 and 158 illustratively capture video or still images that can be transmitted to, and displayed on, a display in operator compartment 101 or a remote device (shown in more detail below) in near real time. Clean grain camera 150, for instance, generates a video feed showing grain passing into clean grain tank 132 (or through clean grain elevator 130). Cameras 156 and 158 illustratively generate a video feed showing the tailings in the elevator and discharge beater and an area of the field behind machine 100, respectively. Alternatively, or in addition to a video feed, captured images can be augmented and presented to the operator, for example in a manner aimed to reduce cognitive load on the operation. These are examples only, and additional or different cameras can be used and/or they can be devices that capture still images or other visual data.

It will also be appreciated that sensor and measurement mechanisms (in addition to the sensors already described) can include other sensors on machine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through machine 100. They can include machine setting sensors that are configured to sense the various configurable settings on machine 100. They can also include a machine orientation sensor that can be any of a wide variety of different types of sensors that sense the orientation or pose of machine 100. Crop property sensors can sense a variety of different types of crop properties, such as crop type, crop moisture, and other crop properties. They can also be configured to sense characteristics of the crop as they are being processed by machine 100. For instance, they can sense grain feed rate, as it travels through clean grain elevator 130. They can sense yield as mass flow rate of grain through elevator 130, correlated to a position from which it was harvested, as indicated by position sensor 157, or provide other output signals indicative of other sensed variables. Some additional examples of the types of sensors that can be used are described below.

In one example, various machine settings can be set and/or controlled to achieve a desired performance. The settings can include such things as concave clearance, rotor speed, sieve and chaffer settings, cleaning fan speed, among others. These settings can illustratively be set or controlled based on expected crop throughput (e.g., the amount of crop processed by machine 100 per unit of time). Thus, if the mass of the crop varies spatially in the field, and the ground speed of machine 100 remains constant, then the throughput will change with crop mass. As discussed below, forward-looking sensor 121 can be utilized to estimate the height of the crop in a given area and to further estimate a volume of the crop that is about to be processed. This volume can be converted into a biomass metric indicative of the biomass of the crop that is about to be engaged. The machine speed can then be controlled based on the estimated biomass to maintain the desired throughput.

Figure 2:
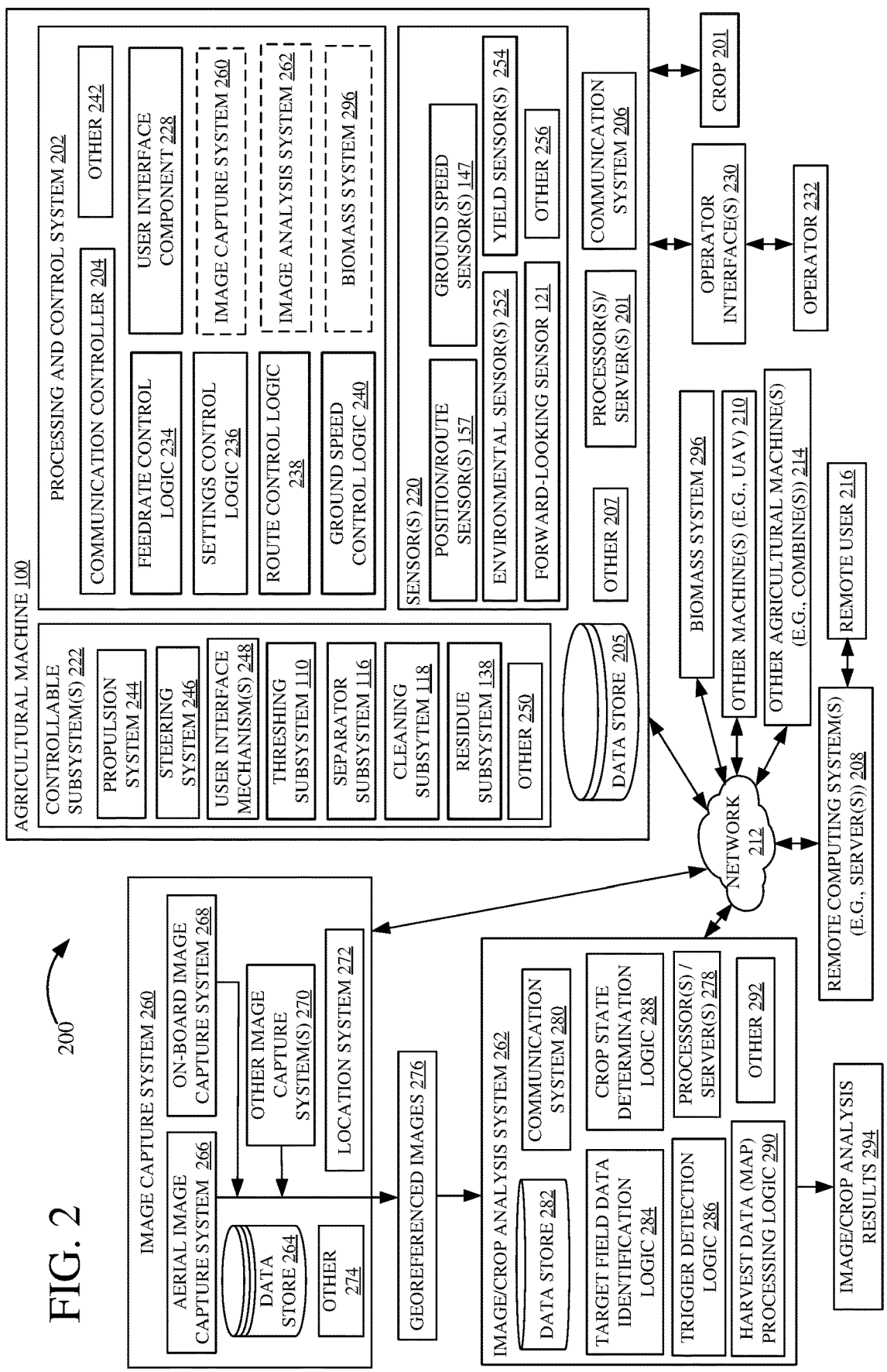
FIG. 2 illustrates one example of an agricultural architecture including the agricultural harvesting machine shown in FIG. 1.

FIG. 2 is a block diagram showing one example of an agricultural architecture 200 that includes the agricultural harvesting machine 100, shown in FIG. 1, that harvests a crop 201. Some items shown in FIG. 2 are similar to those shown in FIG. 1, and they are similarly numbered.

Machine 100 includes a processing and control system 202 (also referred to as control system 202), configured to control other components and systems of architecture 200, one or more processors or servers 203, a data store 205, and it can include other items 207 as well. Data store 205 is configured to store data for use by machine 100, such as field data. Examples include, but are not limited to, field location data that identifies a location of the field to be operated upon by a machine 100, field shape and topography data that defines a shape and topography of the field, crop location data that is indicative of a location of crops in the field (e.g., the location of crop rows), or any other data.

Figure 3:
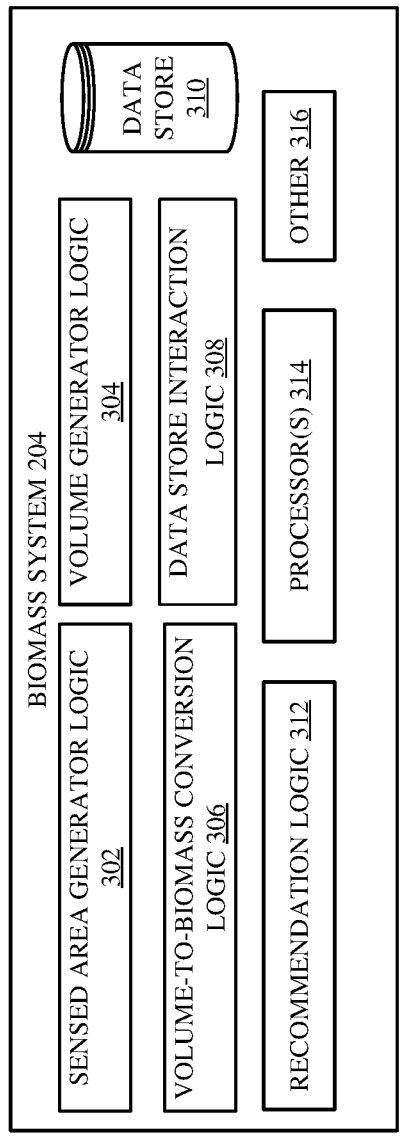
FIG. 3 is a block diagram showing one example of a biomass system.

One example of control system 202 is illustrated in FIG. 3, which will be described in conjunction with FIG. 2. Control system 202 includes a communication controller 204 configured to control a communication system 206 to communicate between components of machine 100 and/or with other machines or systems, such as remote computing system(s) 208 and/or machine(s) 210, either directly or over a network 212. Also, machine 100 can communicate with other agricultural machine(s) 214 as well. Agricultural machine(s) 214 can be a similar machine type as machine 100, and they can be different types of machines as well. Network 212 can be any of a wide variety of different types of networks such as the Internet, a cellular network, a local area network, a near field communication network, or any of a wide variety of other networks or combinations of networks or communication systems.

A remote user 216 is illustrated interacting with remote computing system 208. Remote computing system 208 can be a wide variety of different types of systems. For example, remote computing system 208 can be a remote server environment, remote computing system that is used by remote user 216. Further, it can be a remote computing system, such as a mobile device, remote network, or a wide variety of other remote systems. Remote computing system 208 can include one or more processors or servers, a data store, and it can include other items as well.

Communication system 206 can include wired and/or wireless communication logic, which can be substantially any communication system that can be used by the systems and components of machine 100 to communicate information to other items, such as between control system 202, sensors 220, controllable subsystems 222, image capture system 224, and image analysis system 226. In one example, communication system 206 communicates over a controller area network (CAN) bus (or another network, such as an Ethernet network, etc.) to communicate information between those items. This information can include the various sensor signals and output signals generated by the sensor variables and/or sensed variables.

Control system 202 includes various control logic configured to control subsystem(s) 222 or other systems and components in architecture 200. For example, control system 202 includes user interface component 228 configured to control interfaces, such as operator interface(s) 230 that include input mechanisms configured to receive input from an operator 232 and output mechanisms that render outputs to operator 232. The user input mechanisms can include mechanisms such as a steering wheel, pedals, levers, joysticks, hardware buttons, dials, linkages, switches, keyboards, etc., as well as virtual mechanisms or actuators such as a virtual keyboard or actuators displayed on a touch sensitive screen. The output mechanisms can include speakers and/or display devices (e.g., screens) that display user actuatable elements, such as icons, links, buttons, etc. Where the display is a touch sensitive display, those user actuatable items can be actuated by touch gestures. Similarly, where mechanisms include speech processing mechanisms, then operator 232 can provide inputs and receive outputs through a microphone and speaker, respectively. Operator interface(s) 230 can include any of a wide variety of other audio, visual or haptic mechanisms.

Control system also includes feed rate control logic 234, settings control logic 236, route control logic 238, ground speed control logic 240, and it can include other items 242. Some examples of controllable subsystems 222 are discussed above, and can include propulsion subsystem 244, steering subsystem 246, user interface mechanism(s) 248, threshing subsystem 110, separator subsystem 116, cleaning subsystem 118, residue subsystem 138, material handling subsystem(s), header subsystem(s), and it can include a wide variety of other systems 250, some of which were described above with respect to FIG. 1.

Feed rate control logic 234 illustratively controls propulsion system 244 and/or any other controllable subsystems 222 to maintain a relatively constant feed rate, based upon the yield for the geographic location that machine 100 is about to encounter, or other characteristic(s) predicted by a predictive model. By way of example, if the predictive model indicates that the predicted yield in front of machine 100 (in the direction of travel) is going to be reduced, then feed rate control logic 234 can control propulsion system 244 to increase the forward speed of machine 100 in order to maintain the feed rate relatively constant. On the other hand, if the predictive model indicates that the yield ahead of machine 100 is going to be relatively high, then feed rate control logic 234 can control propulsion system 244 to slow down in order to, again, maintain the feed rate at a relatively constant level.

Settings control logic 236 can generate control signals to adjust machine settings or configuration. For instance, logic 236 can control actuators in order to change machine settings based upon the predicted characteristic of the field being harvested (e.g., based upon the predicted yield, or other predicted characteristic). By way of example, settings control logic 236 may actuate actuators that change, e.g., based upon the predicted yield or biomass to be encountered by machine 100, the concave clearance machine 100, thresher drum/rotor speed, conveyer speed, auger speed, concave clearance, sieve and chaffer settings, cleaning fan speed, etc.

Route control logic 238 can generate control signals and apply them to steering subsystem 246 to control steering of machine 100.

Sensor(s) 220 can include any of a wide variety of different types of sensors. In the illustrated example, sensors 220 include forward-looking sensor 121, speed sensor(s) 147, position sensor(s) 157, environmental sensor(s) 252, yield sensor(s) 254, and can include other types of sensors 256 as well.

Forward looking sensor 121 can be a variety of different sensors, including but not limited to, a camera, a stereo camera, a laser-based sensor, a lidar sensor, a radar sensor, a sonar sensor, an ultrasound-based sensor, a light emitting diode (LED) based lidar sensor, or any other sensor capable of measuring crop height, etc. In one example, forward looking sensor 221 is a laser system or stereo camera system and determines an average crop height across an area of interest. The area of interest is illustratively known and positioned a known distance in front of machine 100. For instance, the area of interest can be centered a known distance in front of the machine 100, as wide as the harvester head and one-quarter meter to one meter deep.

Position sensor(s) 157 are configured to determine a geographic position of machine 100 on the field, and can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. Speed sensor(s) 147 are configured to determine a speed at which machine 100 is traveling the field during the spraying operation. This can include sensors that sense the movement of ground-engaging elements (e.g., wheels or tracks) and/or can utilize signals received from other sources, such as position sensor(s) 157.

As shown in FIG. 2, an image capture system 260 includes image capture components configured to capture one or more images of the area under consideration (i.e., the portions of the field to be operated upon by machine 100) and image processing components configured to process those images. The captured images represent a spectral response captured by image capture system 260 that are provided to an image analysis system 262 and/or stored in data store 264. A spectral imaging system illustratively includes a camera that takes spectral images of the field under analysis. For instance, the camera can be a multispectral camera or a hyperspectral camera, or a wide variety of other devices for capturing spectral images. The camera can detect visible light, infrared radiation, or otherwise.

In one example, the image capture components include a stereo camera configured to capture a still image, a time series of images, and/or a video of the field. An example stereo camera captures high definition video at thirty frames per second (FPS) with one-hundred-and-ten-degree wide-angle field of view. Of course, this is for sake of example only.

Illustratively, a stereo camera includes two or more lenses with a separate image sensor for each lens. Stereo images (e.g., stereoscopic photos) captured by a stereo camera allow for computer stereo vision that extracts three-dimensional information from the digital images. In another example, a single lens camera can be utilized to acquire images (referred to as a "mono" image).

Image capture system 260 can include one or more of an aerial image capture system 266, an on-board image capture system 268, and/or other image capture system 270. An example of aerial image capture system 266 includes a camera or other imaging component carried on an unmanned aerial vehicle (UAV) or drone (e.g., block 210). An example of on-board image capture system 268 includes a camera or other imaging component (e.g., sensor 121) mounted on, or otherwise carried by, machine 100 (or 214). An example of image capture system 270 includes a satellite imaging system. System 260 also includes a location system 272 and can include other items 274 as well. Location system 272 is configured to generate a signal indicative of geographic location associated with the captured image. For example, location system 272 can output GPS coordinates that are associated with the captured image to obtain geo-referenced images 276 that are provided to image analysis system 262.

Image analysis system 262 illustratively includes one or more processors 278, a communication system 280, a data store 282, target field data identification logic 284, trigger detection logic 286, crop state determination logic 288, harvest data (e.g., map) processing logic 290 and can include other items 292 as well.

Communication system 280, in one example, is substantially similar to communication system 206, discussed above. Target field data identification logic 284 is configured to identify a target or subject field under analysis for which images 276 are being analyzed. Also, target field data identification logic 284 is configured to obtain or otherwise identify field data for the target field, such as, but not limited to, terrain data that identifies field topology, harvest data to indicates previous harvesting operations during the current growing season (i.e., what regions of the field have already been harvested), etc.

Trigger detection logic 286 is configured to detect a triggering criterion that triggers the image analysis. For example, in response to detection of a triggering criteria, logic 286 can communication instructions to image capture system 260 to capture images of the target field. These images are then processed by image analysis system 262, and the results of the image analysis are utilized by crop state determination logic 288 to determine a state (e.g., standing crop, downed crop, crop stubble) of the crop represented in the capture images. For instance, as discussed below, logic 288 can perform geometric classification (e.g., height-based classification) of crop plants in the image. As discussed in further detail below, logic 288 is configured to determine that a height of crop plants represented in the captured images is below a threshold, and are thus classified as non-standing crop (i.e., downed or stubble). As used herein, the term "crop plant(s)" refers to crop in both a growing and non-growing state, such as after harvest (referred to as stubble).

Harvest data processing logic 290 is configured to obtain harvest data indicative of area(s) of the field that have already been harvested. In one example, this harvest data includes harvest yield data from particular areas of the field based on prior harvesting passes of machine 100 and/or other harvesting machines. Using this data, image/crop analysis results 294 are generated and output by system 262.

Results 294 illustratively identify areas of the field that include standing crop, downed crop, and crop stubble (i.e., already harvested crop). In one example, results 294 are utilized to generate representation of an amount of plant material in the path of machine 100. This can include any desired characteristic such as, but not limited to, mass, volume, weight, etc. of the crops to be harvested by machine 100. In one example, the representation identifies one or more of a predicted biomass of the crop to be engaged by the header and threshed in machine 100, a predicted crop grain yield, material other than grain (MOG), etc.

In one example, results 294 are provided to biomass system 296 that is configured to estimate a value of the crop that is about to be processed and to convert that volume into a biomass metric indicative of a biomass of the crop that is about to be engaged.

Crop biomass can be indicative of the predicted amount of biomass in the given section of the field. For example, biomass may be indicated as a mass unit (kg) over an area unit ($m^2$). Crop grain yield can be indicative of the predicted amount of yield in the given section of the field. For example, crop grain yield may be indicated as a yield unit (bushel) over an area unit (acre).

In any case, this information can be utilized to control machine 100. Examples of this are discussed in further detail below. Briefly, in one example, the machine speed can be controlled based on the estimated biomass and/or crop yield to maintain a desired throughput.

It is noted that, as illustrated by the dashed boxes in FIG. 2, control system 202 can include some or all of image capture system 260, image analysis system 262, and/or biomass system 296.

Biomass system 296 includes sensed area generator logic 302 that determines the area sensed by forward-looking sensor 121. Volume generator logic 304 uses the area sensed and determines a crop volume or characteristic forward of machine 100. Volume to biomass conversion logic 306 receives a crop volume or characteristic forward of machine 100 and estimates a biomass of the crop in the sensed volume. In one example, this is based on a conversion factor that is based on a sensed variable indicative of actual biomass (e.g., from sensors in machine 100, such as rotor pressure sensor(s)). Datastore interaction logic 308 stores and retrieves information from data store 310. Biomass system 296 also includes recommendation logic 312, one or more processor(s) 314, and can include other items 316. Recommendation logic 312 is configured to generate a recommendation to maintain a desired throughput based on the estimated biomass. The recommendation can be performed either automatically by control system 202 and/or manually by operator 232. Some recommendations that can be generated include changing the ground speed of machine 100, and/or changing machine settings, such as concave settings, sieve and chaffer settings, cleaning fan speed, threshing rotor speed, conveyer/feed speed or cutter speed. Of course, other settings may be changed as well.

Figure 4:
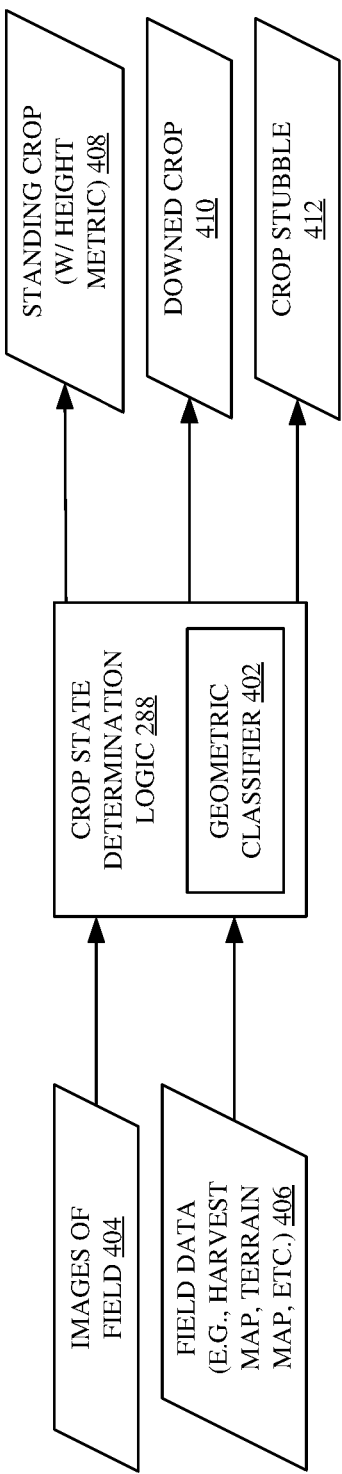
FIG. 4 is a block diagram showing one example of crop state determination logic.

FIG. 4 is a block diagram illustrating one example of crop state determination logic 288. As illustrated, logic 288 includes a geometric classifier 402 and is configured to receive images 404 and field data 406. As discussed above, images 404 can be obtained by image capture system 260, and can include aerial image capture system 266, on-board image capture system 268, etc. For example, the images can be obtained by sensor 121 of an area of the field in front of machine 100 in a direction of forward travel as machine 100 is harvesting the field.

Field data 406 represents characteristics or conditions of the field such as, but not limited to, harvest data, terrain data, etc. This can include a priori and/or in situ data, and can be obtained from a wide variety of different sources. For instance, it can be obtained from UAVs or drones, satellite systems, sensors 220 on machine 100, from other agricultural machines 214, or otherwise. The harvest data, in one example, includes a harvest map that identifies regions of the field that have already been harvested (e.g., by machine 100 and/or other machines 214). The terrain data can comprise a terrain map that identifies a topology of the field (e.g., surface height, slope, etc.).

Using images 404 and field data 406, crop state determination logic 288 outputs image/crop analysis results (e.g., results 294) that represents the state of the crop in the path of machine 100. For instance, areas of the field can be identified as having standing crop. In this case, logic 288 outputs a standing crop classification (block 408), along with a height metric that represents a height of the standing crop plants above the field surface. Logic 288 can also output a downed crop classification (block 410) indicating that the crop plants in a particular area are downed, that is they are unharvested, but not standing (i.e., have a have a height below a threshold). Also, logic 288 can output a crop stubble classification (block 412) indicating that a particular area has already been harvested. An example operation of logic 288 is discussed below.

Figure 5A:
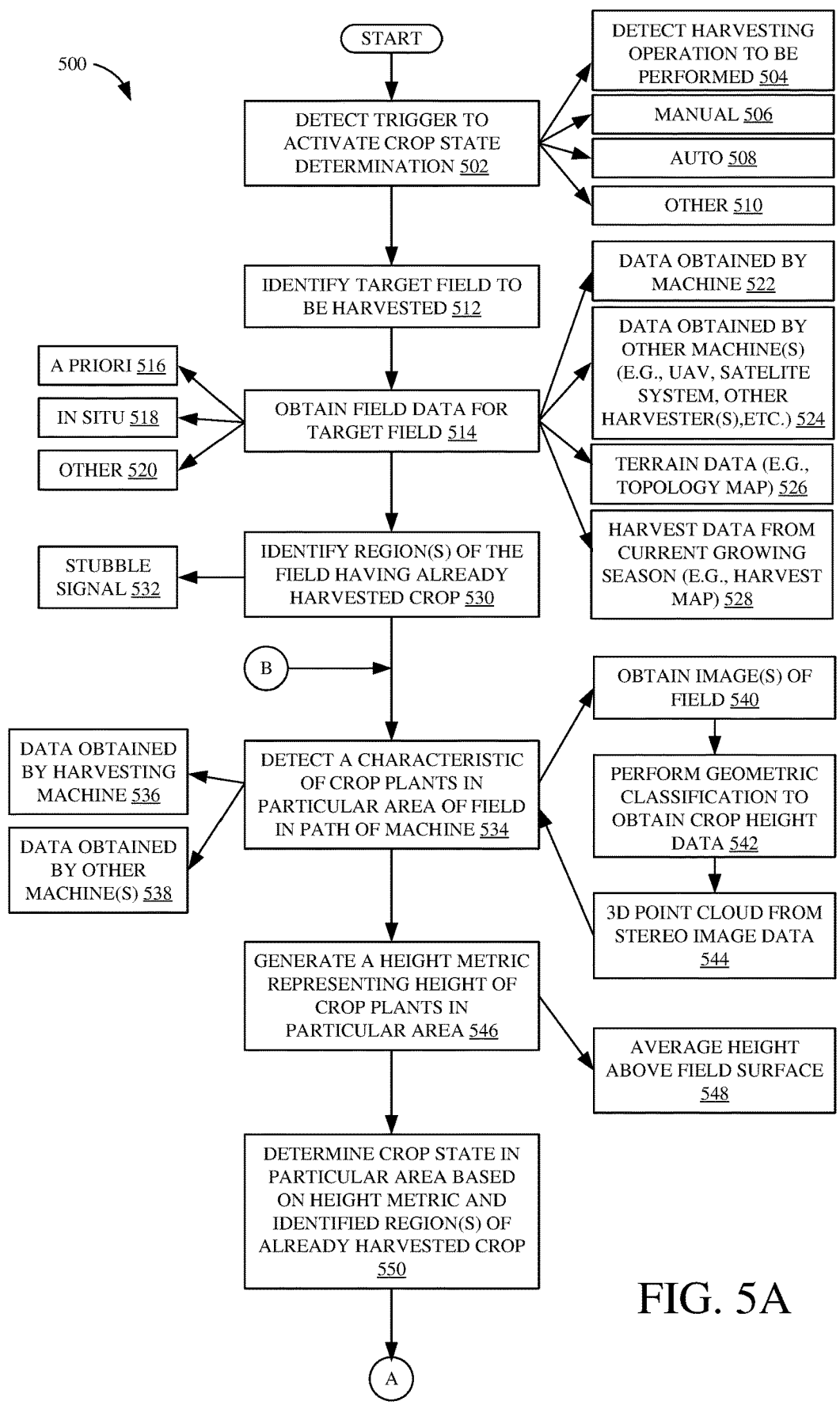
FIGS. 5A and 5B (collectively referred to as FIG. 5) is a flow diagram showing an example operation that determines crop state and generates a control signal based on a predicted amount of crop material.
Figure 5B:
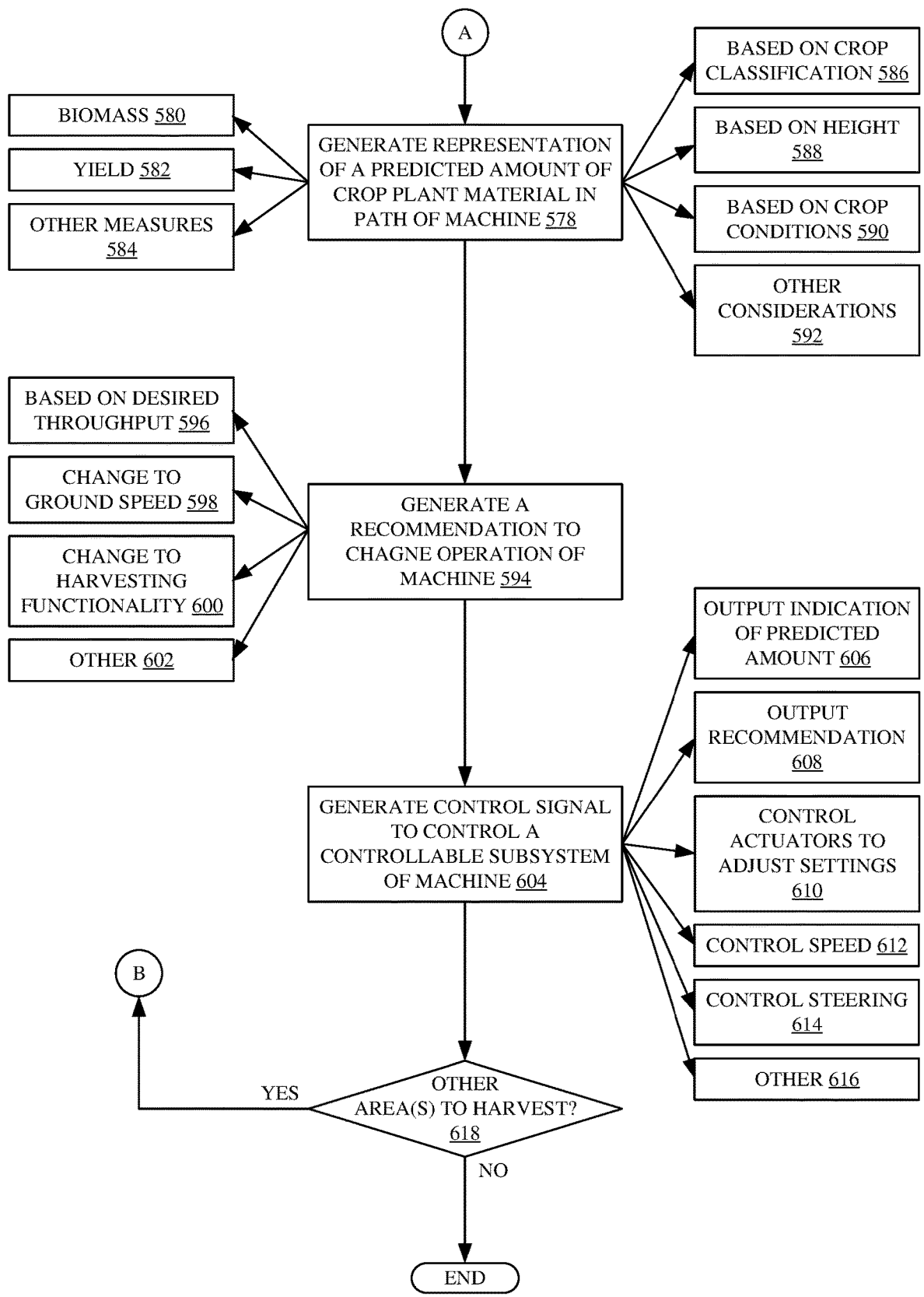

FIG. 5 is a block diagram 500 for determining crop state in a field and generating corresponding control signals to control the agricultural machine. For sake of illustration, but not by limitation, FIG. 5 will be described in the context of architecture 200 shown in FIG. 2.

At block 502, logic 286 detects a trigger to activate crop state determination. In one example, the trigger includes detecting that a harvesting operation is to be performed by machine 100. This is represented by block 504. Detection of the trigger can also include detecting manual inputs (block 506), or can occur automatically (block 508). Of course, the trigger can be detected in other ways as well. This is represented by block 510.

At block 512, a target field to be harvested is identified. In one example, this can include an input from operator 232 that identifies the target field to control system 202. In another example, the target field can be identified automatically based on geographical position information that identifies a location of machine 100 (e.g., using signals from sensor(s) 157).

At block 514, field data for the target field is identified. As noted above, in one example field data 406 is obtained by crop state determination logic 288, and can include a priori data (block 516), in situ data (block 518) or other data (block 520). In any case, this data can be obtained by machine 100 (block 522), or other machines or systems such as remote computing system 208, machine(s) 210, machine(s) 214, etc. This is represented by block 524.

The field data can include terrain data 526, such as a topology map of the target field. The field data can also obtain harvest data 528 indicating a harvesting operation from the current growing season. For instance, a harvest map indicating yield data from the target field can be obtained.

Based on the harvest data, regions of the field having already harvested crop is identified. This is represented by block 530. For example, a stubble signal at block 532 is generated that identifies regions of the field that are already harvested and are to be classified as crop stubble areas.

At block 534, characteristic(s) of crop plants in a particular area of the field (in a path of machine 100) are detected. Illustratively, a characteristic represents a height of the crop plants above the field surface. The characteristic can be detected based on data obtained by harvesting machine 100 (block 536) and/or data obtained by other machines (such as those discussed above with respect to block 524). This is represented by block 538.

In one example of block 534, images of the field are obtained at block 540 and geometric classification is performed at block 542 to obtain crop height data. In one example, a 3D point cloud is generated from stereo image data at block 544.

At block 546, a height metric representing height of the crop plants in the particular area is generated. In one example, the height metric generated at block 546 represents an average height of the crop plants above the field surface. This is indicated by block 548.

It is noted that the particular area for which the crop plant characteristic is detected at block 534, and the height metric generated at block 546, can be identified in any of a number of ways. For instance, the area can be a pre-defined area in front of machine 100. To illustrate, the predefined area can be defined as the width of the header, between zero to twenty feet in front of the header.

Also, the area can be selected arbitrarily and/or based on identified boundaries, identified from the image data. For instance, based on the image data, portions of the field having differing crop heights (beyond a height difference threshold) can be identified. In this way, the selected areas roughly follow the boundaries between standing crop, downed crop, and/or crop stubble.

At block 550, a crop state in the particular area is determined based on the height metric generated at block 546 and the identified regions of already harvested crop, identified at block 530. One example of block 540 is illustrated in FIG. 6.

Figure 6:
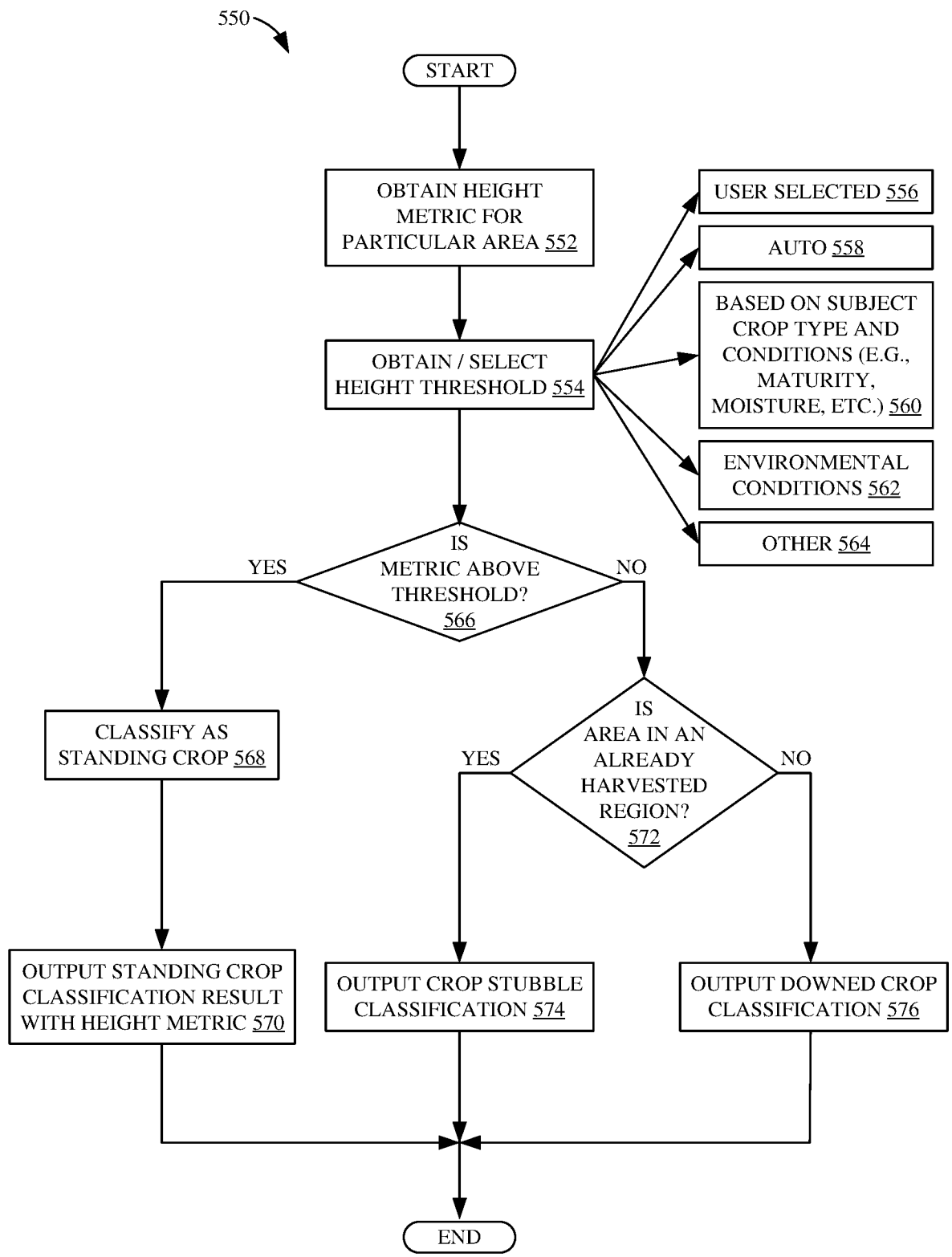
FIG. 6 is a flow diagram showing an example operation that determines crop state.

In the example of FIG. 6, at block 552, the height metric for the particular area is generated. The height metric represents the height of the crop plants in the particular area. For instance, the height metric can represent the average height of the crop plants in the particular area. This can be generated in any of a number of ways. In one example, the ground plane (represented the surface of the field) is estimated based on sensor data from sensor(s) 220 and/or based on remotely received data, such as a terrain map from system 208.

At block 554, a height threshold is selected or otherwise obtained. The height threshold can be user-selected (represented at block 556). In another example, the height threshold is selected automatically. This is represented by block 558. The height threshold can be based on any of a number of factors. For instance, the height threshold can be based on the crop type and/or conditions of the crop being harvested in the field. For instance, conditions such as maturity, moisture content, etc. can be utilized to determine an expected height of standing crop plants in the field. This is represented by block 560. Also, environmental conditions can be used to select the height threshold. This is represented by block 562. For instance, the environmental conditions can indicate current or prior wind speeds, precipitation, to name a few. Of course, the height threshold can be selected in any of a number of other ways and based on any of a number of other considerations. This is represented by block 564.

At block 566, logic 288 determines whether the height metric is above the threshold obtained at block 544. If so, the particular area of the field is classified as standing crop. This is represented by block 568. In this case, a standing crop classification result is output (e.g., block 408) along with the height metric that represents a height of the standing crop in the particular area. This is represented by block 570.

If the height metric is not above the threshold, then block 572 determines whether the area is within an already harvested region of the field. If so, the area is classified as a crop stubble area and crop stubble classification is output at block 574.

If the area is not in an already harvested region, block 576 classifies the area as having downed crop and a downed crop classification is output. At this point, it is worth noting that, in the present example, differentiation between the crop stubble and downed crop at blocks 574 and 576, respectively, can be achieved without requiring a trained image classifier to classify images of non-standing crop. As noted above, utilizing such image classifiers to distinguish between crop stubble and downed crop require extensive training with large amounts of training data, which in turn requires large amounts of processing bandwidth and time. Often, such classifiers can be inaccurate with results in incorrect biomass or yield predictions.

Returning again to FIG. 5, at block 578, a representation of a predicted amount of crop plant material in the path of the machine is generated. This representation can take any of a number of forms. For instance, block 578 can predict the biomass to be encountered by machine 100 as it moves across the field. This is represented by block 580. Alternatively, or in addition, block 578 can predict the yield from the field. This is represented by block 582. Of course, other measures can be utilized as well. This is represented by block 584.

In one example, the representation generated at block 578 is based on the crop classification, that is, the determined crop state at block 550. This is represented by block 586. For instance, the predicted amount of crop plant material is based on whether the area is standing crop, downed crop, and/or crop stubble. Also, the predicted amount of crop plant material (mass flow) can be based on the crop height. This is represented by block 588. As such, mass flow through the machine 100 can be determined based on the classified areas in front of machine 100, as well as the sensed crop height within those areas. Settings (e.g., speed, etc.) of the machine can be controlled based on the determined mass flow.

Alternatively, or in addition, the predicted amount of crop plant material can be based on other crop conditions. This is represented at block 590. For example, but not by limitation, predictions can be made based normalized difference vegetation index (NDVI) images that indicate growth stages, moisture stress (drought), plant stock diameter, weed presence, etc. Of course, other considerations can be taken into account in generating the representation of a predicted amount of crop plant material. This is represented by block 592.

At block 594, a recommendation to change operation of machine 100 is generated based on the predicted amount of crop plant material, generated at block 578. For example, the recommendation can be generated based on a desired throughput of machine 100. This is represented by block 596. In other examples, the recommendation can be based on target performance of machine 100, such as grain quality, productivity, fuel consumption, or any other performance metric.

The recommended change can include a change to the ground speed of machine 100. This is represented by block 598. Alternatively, or in addition, the recommended change can comprise a change to harvesting functionality of machine 100. This is represented by block 600. For example, changes to the harvesting functionality can include changes to the header, threshing subsystem 110, separator subsystem 116, cleaning subsystem 118, residue subsystem 138, or any other controllable subsystems of machine 100. Of course, other recommendations can be generated as well. This is represented by block 602.

At block 604, a control signal is generated by control system 202 (e.g., using user interface component 228, logic 234, logic 236, logic 238, logic 240, etc.) to control one or more of controllable subsystems 222. For example, user interface mechanisms 248 can be controlled by user interface component 228 to output an indication of the predicted amount of crop plant material in the plant path of the machine (represented by block 606) and/or to output the recommendation generated at block 594. This is represented by block 608. For example, the outputs at blocks 606 and/or 608 can be provided through a display device, speakers, etc.

Alternatively, or in addition, the control signals generated at block 604 can control actuators to adjust settings of controllable subsystem(s) 222. This is represented by block 610. For example, with respect to machine 100 illustrated in FIG. 1, the position of header 102 can be adjusted, the rotor pressure of separator 116 can be adjusted, the operation of cleaning subsystem 118 can be adjusted. These, of course, are for sake of example only.

Also, a control signal can be generated to control propulsion system 244 to control the ground speed of machine 100. This is represented by block 612. Alternatively, or in addition, control systems can be generated to control steering system 246, to control steering of machine 100. This is represented by block 614. Of course, machine 100 (or other machines and systems in architecture 200) can be controlled in other ways as well. This is represented by block 616. At block 618, operation determines whether there are other areas to be harvested on the field. If so, operation can return to block 534 to harvest subsequent areas of the field in the path of machine 100.

For sake of illustration, but not by limitation, the operations illustrated in FIG. 5 will be described in the context of FIG. 7-1, which shows an example field 700 on which machine 100 is operating to harvest crop plants 702. As shown, machine 100 is traveling along a path 704 in a forward direction represented by arrow 706. Header 102 operates to harvest the crop plants 702 as machine 100 travels along path 704. The field data obtained at block 514 includes harvest data that identifies a region 708 of the field that has already been harvested (e.g., by machine 100, or another harvester, operating in field 700).

Forward-looking sensor 121 (illustratively a stereo camera) captures images of crop plants 702 in path 704 ahead of machine 100. Block 534 identifies characteristics of the crop plants in path 704 by performing geometric classification, block 542, based on the images obtained by sensor 121. Block 536 generates a first height metric representing a height of the crop plant materials in a first area (represented by dashed block 710) and a second height metric representing a height of crop plants in a second area (represented by dashed block 712). The first height metric indicates that the crop plants 702 in area 710 have an average height that is above a selected threshold. Thus, area 710 is classified as standing crop. The second height metric indicates that the crop plants 702 in area 712 have an average height that is below the selected threshold. Thus, area 712 is classified as non-standing crop.

Additionally, based on the identification of region 708 as being already harvested, area 714 is removed from the non-standing crop area 712, and is classified as crop stubble. The remaining portion of area 712 (that is, area 716) is identified as downed crop. In other words, area 716 is identified as an unharvested area having a height metric below the threshold. Using the information from classified areas 710, 714, and 716, biomass system 296 can generate a representation of a predicted amount of crop material (e.g., a biomass) in path 704.

Figures 1, 7:
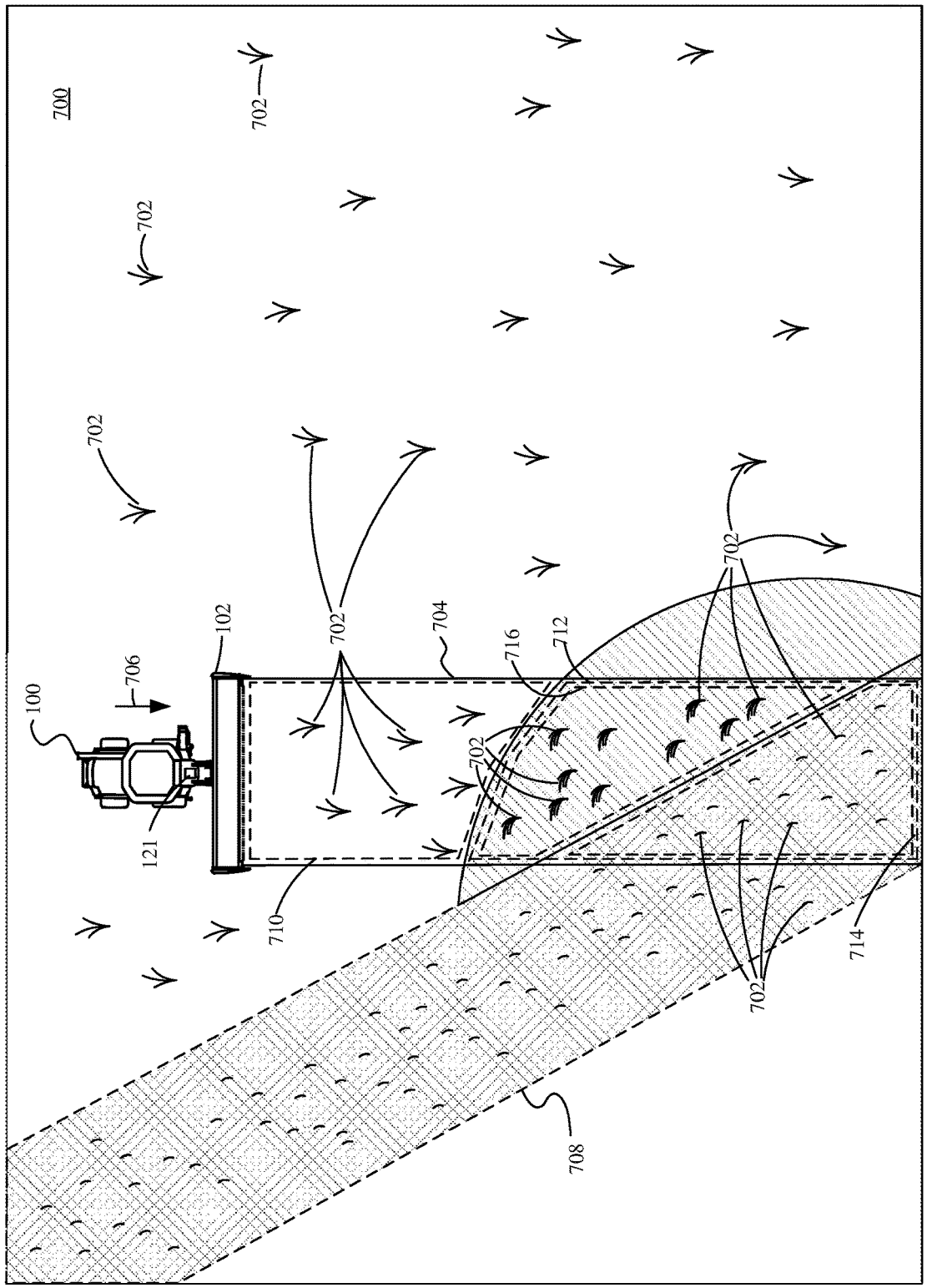
Figures 2, 7:
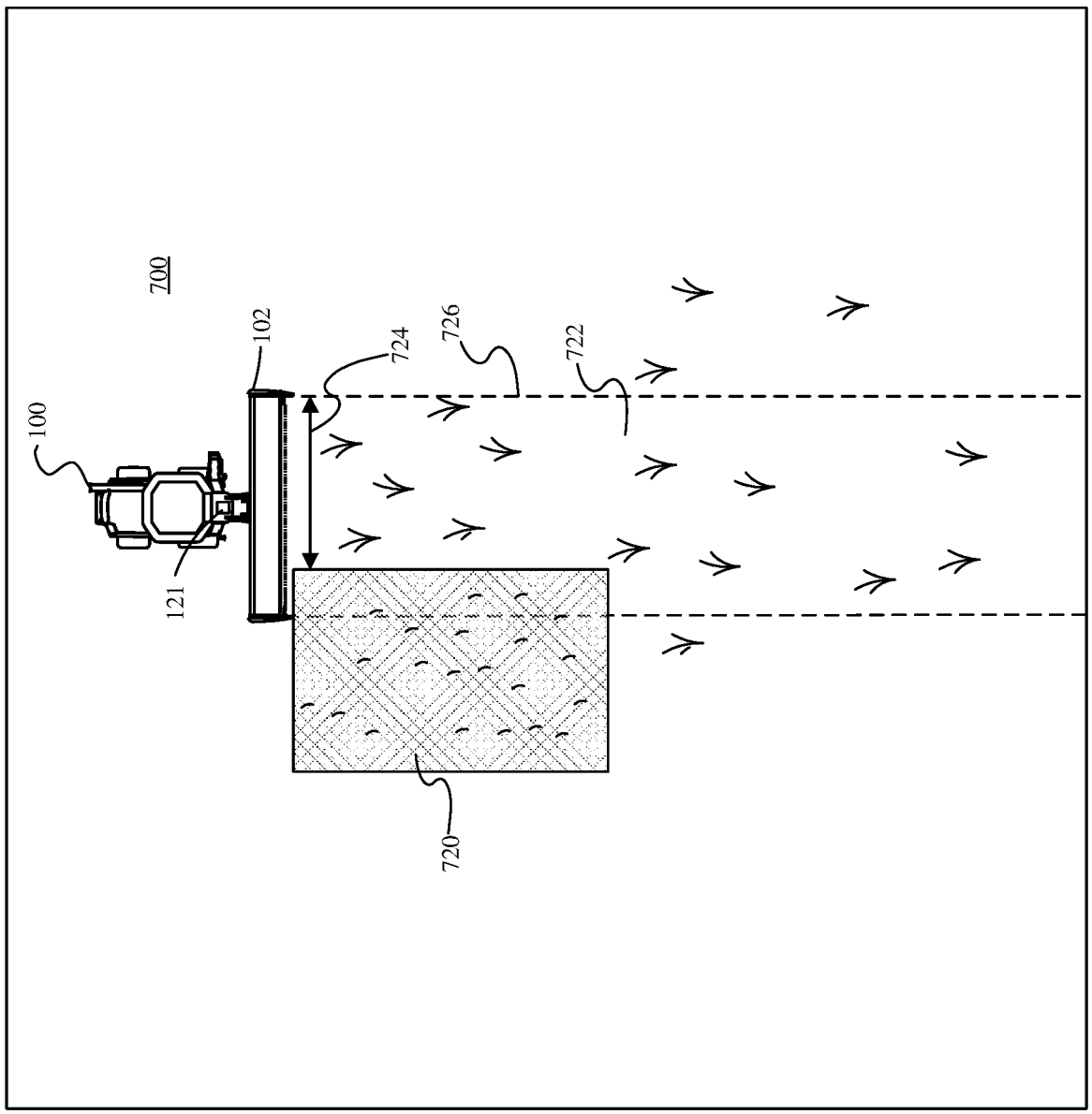

FIG. 7-2 illustrates one example of calculating mass flow for machine 100 harvesting field 700. Area 720 is identified as crop stubble based on prior harvesting data, and area 722 is identified as standing crop based on image processing determining that the height of crop within area 722 is above a standing threshold. In this example, area 720 is treated as a binary signal (i.e., it is either crop stubble or not crop stubble), and is thus ignored for purposes of mass flow determination. Conversely, area 722 is analyzed to determine contribution to mass flow. In one example, system 204 determines the amount of crop material based on the width 724 of area 722 that resides within the path 726 of header 102 and crop height (e.g., a height metric indicating average crop height in area 722). Based on this determination, the speed (or other settings) of machine 100 is controlled.

It can thus be seen that the present system provides a number of advantages. For example, but not by limitation, the present system generates predictions of crop plant material for control of an agricultural harvesting machine, which improves operation of the machine such as by maintaining a desired throughput. Further, the present system uses geometric classification to determine whether areas of the field are standing crop, downed crop, or crop stubble by leveraging harvest data. This classification between downed crop and crop stubble is made by leveraging harvest data, without requiring a specific image classifier performing a classification task.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
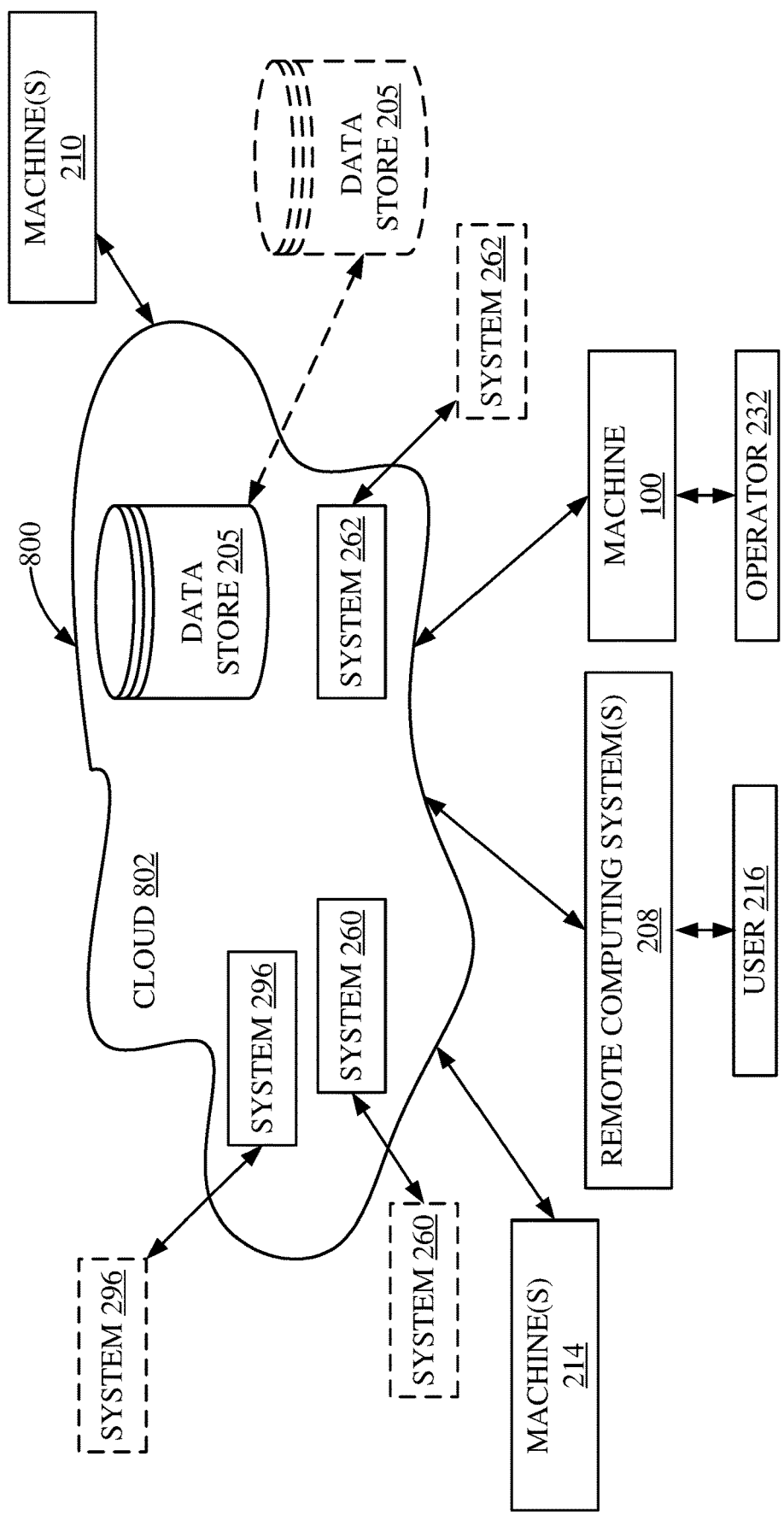
FIG. 8 is a block diagram showing one example of the architecture illustrated in FIG. 3, deployed in a remote server architecture.

FIG. 8 is a block diagram of one example of the architecture shown in FIG. 2, where machine 100 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIG. 2 and they are similarly numbered. FIG. 8 specifically shows that system 260, system 262, system 296, and/or data store 205 can be located at a remote server location 802. Therefore, agricultural machine 100, machine(s) 210, machine(s) 214, and/or system(s) 208 access those systems through remote server location 802.

FIG. 8 also depicts another example of a remote server architecture. FIG. 8 shows that it is also contemplated that some elements of FIG. 2 are disposed at remote server location 802 while others are not. By way of example, data store 205 can be disposed at a location separate from location 802, and accessed through the remote server at location 802. Alternatively, or in addition, one or more of systems 260, 262, and 296 can be disposed at location(s) separate from location 802, and accessed through the remote server at location 802.

Regardless of where they are located, they can be accessed directly by agricultural machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
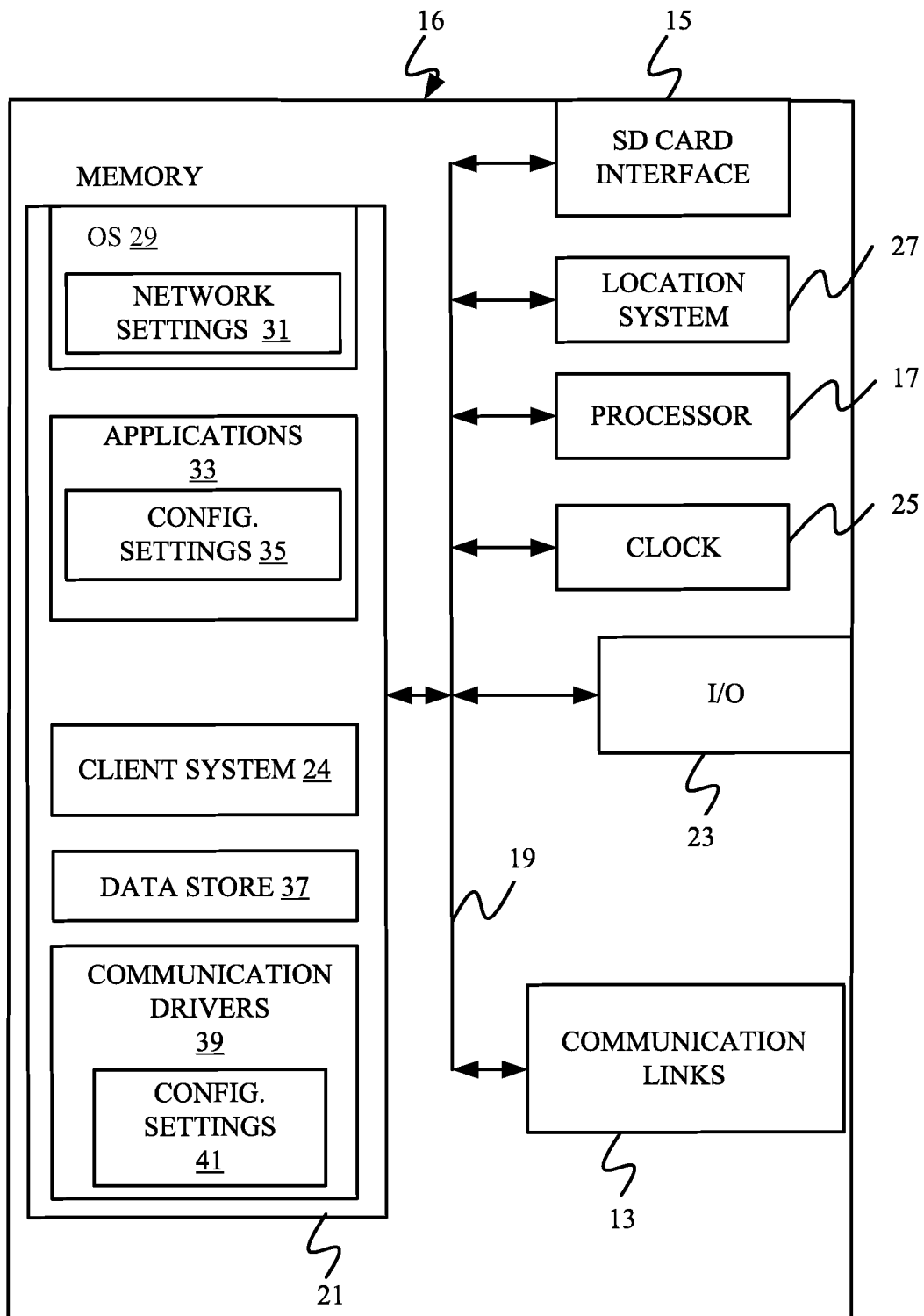
FIGS. 9-11 show examples of mobile devices that can be used in the architectures shown in the previous figures.
Figure 10:
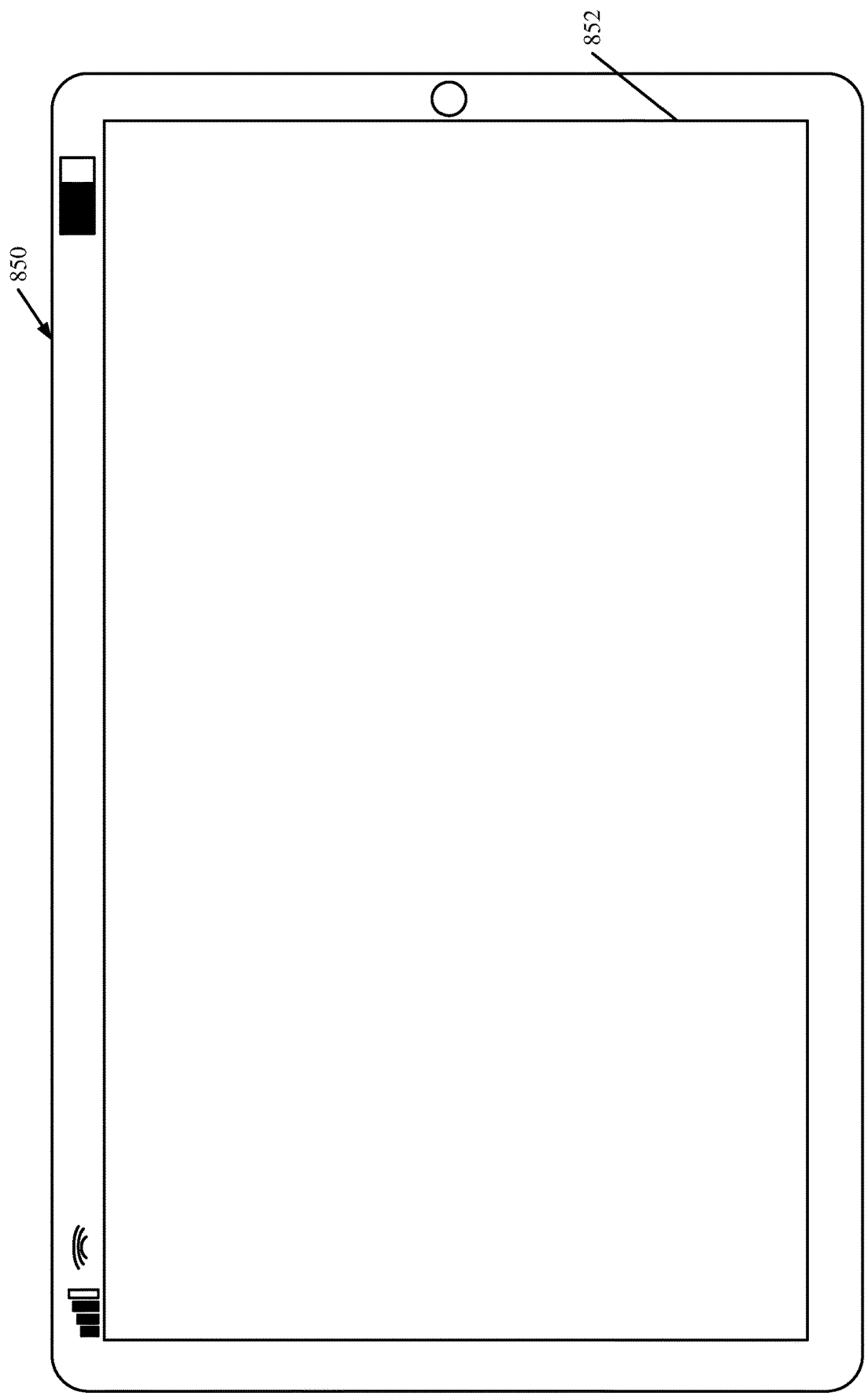
Figure 11:
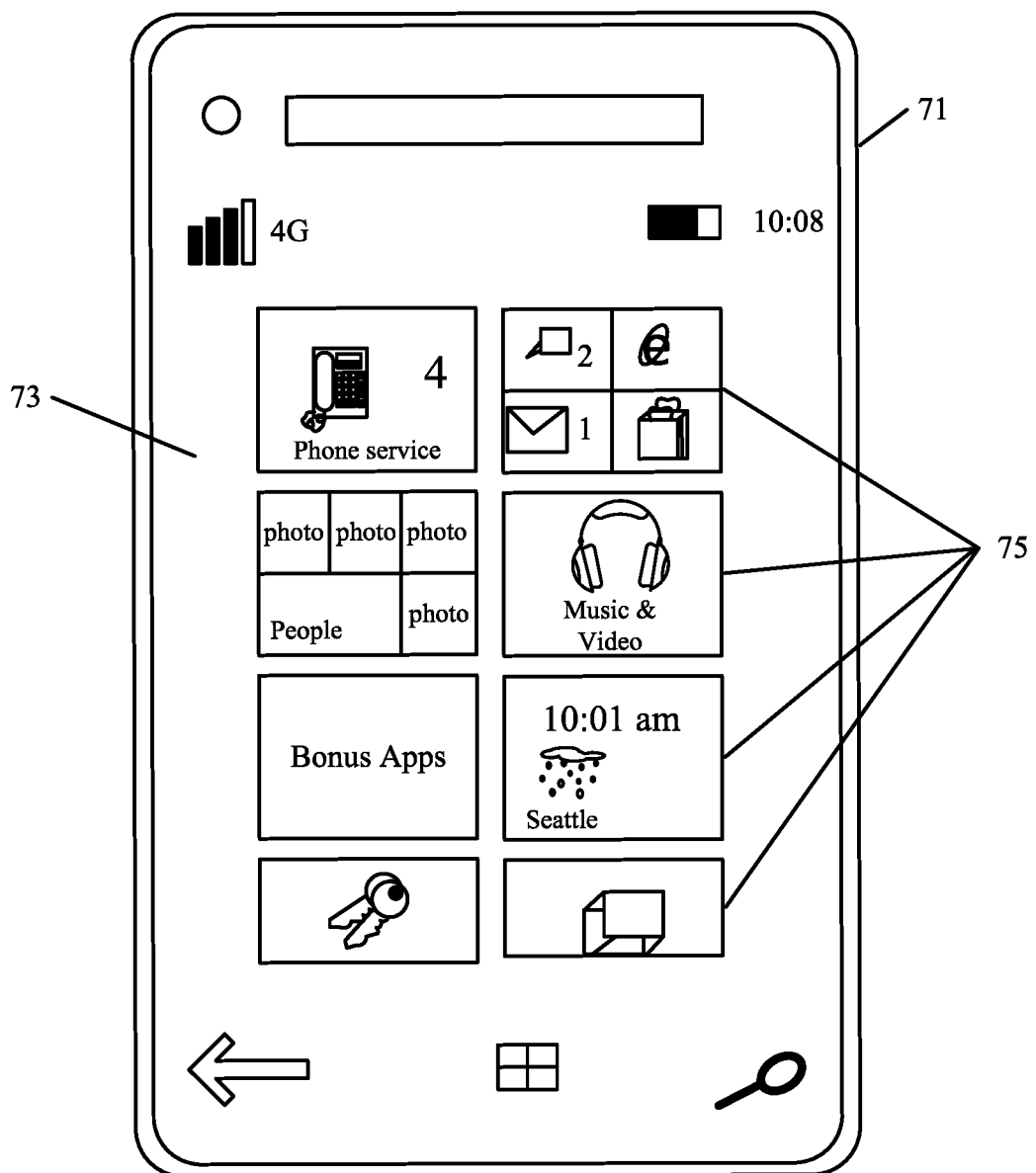

FIG. 9 is a simplified block diagram of one illustrative example of a handheld or mobile computing device that can be used as a user's or client's handheld device 16, in which the present system (or parts of it) can be deployed. For instance, a mobile device can be deployed in the operator compartment of agricultural machine 100 or as remote computing system 208. FIGS. 10-11 are examples of handheld or mobile devices.

FIG. 9 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 850. In FIG. 10, computer 850 is shown with user interface display screen 852. Screen 852 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 850 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
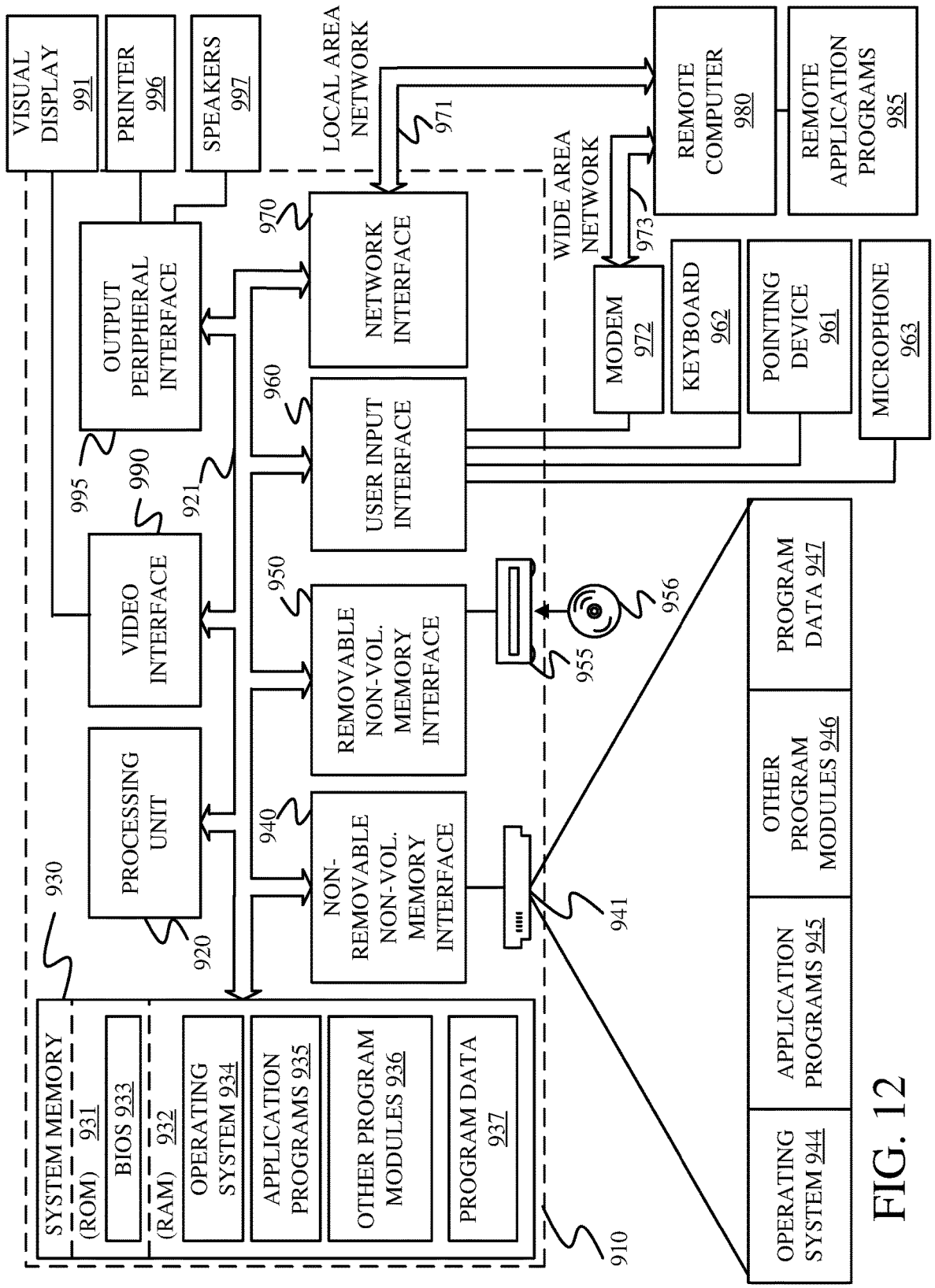
FIG. 12 is a block diagram showing one example of a computing environment that can be used in the architectures shown in the previous figures.

FIG. 12 is one example of a computing environment in which elements of FIG. 2, or parts of it, (for example) can be deployed. With reference to FIG. 12, an example system for implementing some embodiments includes a computing device in the form of a computer 910. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 2 can be deployed in corresponding portions of FIG. 12.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 12 illustrates operating system 934, application programs 935, other program modules 936, and program data 937.

The computer 910 may also include other removable/non-removable volatile/nonvolatile computer storage media. By way of example only, FIG. 12 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 is typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 910. In FIG. 12, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network—WAN or a controller area network—CAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 12 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a computer-implemented method comprising:
obtaining harvest data indicative of a prior harvesting operation on a field;
identifying a region of the field having already-harvested crop plants based on the harvest data;
detecting a characteristic of crop plants in a field in a path of an agricultural harvesting machine in a direction of travel;
generating, based on the detected characteristic, a height metric representing a height of the crop plants on a particular area of the field; and
generating a control signal to control the agricultural harvesting machine based on the height metric and the identified region.

Example 2 is the computer-implemented method of any or all previous examples, and further comprising:
identifying the crop plants on the particular area of the field as downed crop based on the harvest data and a determination that the height metric indicates a crop height below a threshold; and
generating the control signal to control the agricultural harvesting machine based on the identification of downed crop on the particular area of the field.

Example 3 is the computer-implemented method of any or all previous examples, wherein generating a control signal comprises controlling a controllable subsystem of the agricultural harvesting machine.

Example 4 is the computer-implemented method of any or all previous examples, and further comprising generating a recommendation to change operation of the agricultural harvesting machine.

Example 5 is the computer-implemented method of any or all previous examples, wherein the recommendation is generated based on a selected crop throughput.

Example 6 is the computer-implemented method of any or all previous examples, wherein the recommendation comprises at least one of:
a change to a ground speed of the agricultural harvesting machine; or
a change to harvesting functionality on the agricultural harvesting machine.

Example 7 is the computer-implemented method of any or all previous examples, wherein generating a control signal comprises controlling a display device to provide an indication of the recommendation.

Example 8 is the computer-implemented method of any or all previous examples, wherein the height metric comprises an average height of crop plants on the particular area.

Example 9 is the computer-implemented method of any or all previous examples, and further comprising:
generating a representation of an amount of crop plant material in the path of the agricultural harvesting machine; and
generating the control signal based on the amount of crop plant material.

Example 10 is the computer-implemented method of any or all previous examples, wherein the representation of an amount of crop plant comprises an indication of biomass.

Example 11 is the computer-implemented method of any or all previous examples, wherein detecting a characteristic of the crop plants comprises:
receiving image data of the crop plants in the particular area;
applying a geometric classifier to the image data; and
determining the height metric based on the geometric classifier.

Example 12 is the computer-implemented method of any or all previous examples, and further comprising
identifying a plurality of areas of the field; and
for each given area of the field,
generating a corresponding height metric representing a height of the crop plants above a surface of the field on the given area;
comparing the corresponding height metric to the threshold;
classifying the given area based on the comparison; and
generating a control signal corresponding to the given area based on the classification.

Example 13 is the computer-implemented method of any or all previous examples, wherein classifying the given area comprises:
classifying the given area as standing crop if the corresponding height metric is above the threshold; and
classifying the given area as non-standing crop if the corresponding height metric is below the threshold.

Example 14 is the computer-implemented method of any or all previous examples, wherein classifying the given area as non-standing crop comprises:
classifying the given area as crop stubble based on a determination that the given area was harvested during the prior harvesting operation; and
classifying the given area as downed crop based on a determination that the given area was not harvested during the prior harvesting operation.

Example 15 is an agricultural harvesting machine comprising:
a controllable subsystem;
a forward-looking crop sensor configured to generate a sensor signal indicative of a detected characteristic of crop plants in a field in a path of an agricultural harvesting machine in a direction of travel;
crop state determination logic configured to:
obtain harvest data indicative of a prior harvesting operation on the field;
identify a region of the field having already-harvested crop plants based on the harvest data;
generate, based on the detected characteristic, a height metric representing a height of the crop plants on a particular area of the field; and
a control system configured to control the controllable subsystem based on the height metric and the identified region.

Example 16 is the agricultural harvesting machine of any or all previous examples, wherein the control system is configured to:
generate a representation of an amount of crop plant material in the path of the agricultural harvesting machine based on the height metric and the identified region; and
generate a recommendation to change operation of the controllable subsystem based on the representation of the amount of crop plant material.

Example 17 is the agricultural harvesting machine of any or all previous examples, wherein
the crop state determination logic is configured to:
identify a plurality of areas of the field; and
for each given area of the field,
receive image data of the crop plants in the given area;
apply a geometric classifier to the image data; and
generate a corresponding height metric representing a height of the crop plants above a surface of the field on the given area;
compare the corresponding height metric to the threshold; and
classify the given area based on the comparison; and
the control logic is configured to generate a control signal corresponding to the given area based on the classification.

Example 18 is the agricultural harvesting machine of any or all previous examples, wherein the crop state determination logic is configured to:
classify the given area as standing crop based on a determination that the corresponding height metric is above the threshold;
classify the given area as crop stubble based on a determination that the corresponding height metric is below the threshold and that the given area resides within the given region; and
classify the given area as downed crop based on a determination that the corresponding height metric is below the threshold and the given area does not reside within the given region.

Example 19 is a control system for an agricultural machine, the control system comprising:
harvest data processing logic configured to receive harvest data indicative of a prior harvesting operation on a field and to identify a region of the field having already-harvested crop plants based on the harvest data;
crop state classification logic configured to:
detect a characteristic of crop plants in a field in a path of an agricultural harvesting machine in a direction of travel; and
generate, based on the detected characteristic, a height metric representing a height of the crop plants on a particular area of the field; and
control logic configured to generate a control signal to control the agricultural harvesting machine based on the height metric and the identified region.

Example 20 is the control system for an agricultural machine of any or all previous examples, wherein
the crop state classification logic is configured to:
identify a plurality of areas of the field; and
for each given area of the field,
receive image data of the crop plants in the given area;
apply a geometric classifier to the image data; and
generate a corresponding height metric representing a height of the crop plants above a surface of the field on the given area;
compare the corresponding height metric to the threshold;
classify the given area as standing crop based on a determination that the corresponding height metric is above the threshold;
classify the given area as crop stubble based on a determination that the corresponding height metric is below the threshold and that the given area resides within the given region; and
classify the given area as downed crop based on a determination that the corresponding height metric is below the threshold and the given area does not reside within the given region; and
the control logic is configured to generate a control signal corresponding to each given area based on the classification of the given area.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
obtaining harvest data indicative of a prior harvesting operation that includes a prior harvesting pass of one or more harvesting machines, performed prior to obtaining the harvest data, on a field;
identifying a region of the field having already-harvested crop plants based on the harvest data;
detecting a characteristic of crop plants on the field in a path of an agricultural harvesting machine in a direction of travel;
generating, based on the detected characteristic, a height metric representing a height of the crop plants in the path; and
generating a control signal to control the agricultural harvesting machine based on the height metric and the region.

2. The computer-implemented method of claim 1, and further comprising:
identifying the crop plants in the path as downed crop based on the harvest data and a determination that the height metric indicates a crop height below a threshold; and
generating the control signal to control the agricultural harvesting machine based on the identification of downed crop in the path.

3. The computer-implemented method of claim 1, wherein generating the control signal comprises controlling a controllable subsystem of the agricultural harvesting machine.

4. The computer-implemented method of claim 3, and further comprising generating a recommendation to change operation of the agricultural harvesting machine.

5. The computer-implemented method of claim 4, wherein the recommendation is generated based on a selected crop throughput that represents a rate of harvested crop through the agricultural harvesting machine.

6. The computer-implemented method of claim 4, wherein the recommendation comprises at least one of:
a change to a ground speed of the agricultural harvesting machine; or
a change to harvesting functionality on the agricultural harvesting machine.

7. The computer-implemented method of claim 4, wherein generating the control signal comprises controlling a display device to provide an indication of the recommendation.

8. The computer-implemented method of claim 1, wherein the height metric comprises an average height of crop plants in the path.

9. The computer-implemented method of claim 1, and further comprising:
generating a representation of an amount of crop plant material in the path of the agricultural harvesting machine; and
generating the control signal based on the amount of crop plant material.

10. The computer-implemented method of claim 1, wherein the one or more harvesting machines includes the agricultural harvesting machine.

11. The computer-implemented method of claim 1, wherein detecting a characteristic of the crop plants comprises:
receiving image data of the crop plants in the path;
applying a geometric classifier to the image data; and
determining the height metric based on the geometric classifier.

12. The computer-implemented method of claim 1, and further comprising
identifying a plurality of areas in the path; and
for each respective area of the plurality of areas,
generating a corresponding height metric representing a height of the crop plants above a surface of the field on the respective area;
comparing the corresponding height metric to the threshold;
classifying the respective area based on the comparison; and
controlling the controllable subsystem of the agricultural harvesting machine corresponding to the respective area, of the plurality of areas, based on the classification.

13. The computer-implemented method of claim 12, wherein classifying the respective area comprises:
classifying the respective area as standing crop if the corresponding height metric is above the threshold; and
classifying the respective area as non-standing crop if the corresponding height metric is below the threshold.

14. The computer-implemented method of claim 13, wherein classifying the respective area as non-standing crop comprises:

classifying the respective area as crop stubble based on a determination that the respective area was harvested during the prior harvesting operation; and
classifying the respective area as downed crop based on a determination that the respective area was not harvested during the prior harvesting operation.

15. An agricultural harvesting machine comprising:
a controllable subsystem;
a forward-looking crop sensor configured to generate a sensor signal indicative of a detected characteristic of crop plants in a field in a path of an agricultural harvesting machine in a direction of travel;
crop state determination logic configured to:
obtain harvest data indicative of a prior harvesting operation on the field that includes a prior harvesting pass of one or more harvesting machines prior to the crop state determination logic obtaining the harvest data;
identify a region of the field having already-harvested crop plants based on the harvest data;
generate, based on the detected characteristic, a height metric representing a height of the crop plants on a particular area of the field; and
a control system configured to control the controllable subsystem based on the height metric and the region.

16. The agricultural harvesting machine of claim 15, wherein the control system is configured to:
generate a representation of an amount of crop plant material in the path of the agricultural harvesting machine based on the height metric and the region; and
generate a recommendation to change operation of the controllable subsystem based on the representation of the amount of crop plant material.

17. The agricultural harvesting machine of claim 15, wherein
the crop state determination logic is configured to:
identify a plurality of areas of the field; and
for each respective area of the plurality of areas,
receive image data of the crop plants in the respective area;
apply a geometric classifier to the image data; and
generate a corresponding height metric representing a height of the crop plants above a surface of the field on the respective area;
compare the corresponding height metric to the threshold; and
classify the respective area based on the comparison; and
the control logic is configured to control the controllable subsystem of the agricultural harvesting machine corresponding to each respective area, of the plurality of areas, based on the classification.

18. The agricultural harvesting machine of claim 17, wherein the crop state determination logic is configured to:
classify the respective area as standing crop based on a determination that the corresponding height metric is above the threshold;
classify the respective area as crop stubble based on a determination that the corresponding height metric is below the threshold and that the respective area resides within the region; and
classify the respective area as downed crop based on a determination that the corresponding height metric is below the threshold and the respective area does not reside within the region.

19. A control system for an agricultural harvesting machine, the control system comprising:

harvest data processing logic configured to:
  receive harvest data indicative of a prior harvesting operation that includes a prior harvesting pass of one or more harvesting machines, performed prior to obtaining the harvest data, on a field; and
  identify a region of the field having already-harvested crop plants based on the harvest data;
crop state classification logic configured to:
  detect a characteristic of crop plants on the field in a path of an agricultural harvesting machine in a direction of travel; and
  generate, based on the detected characteristic, a height metric representing a height of the crop plants in the path; and
control logic configured to generate a control signal to control the agricultural harvesting machine based on the height metric and the region.

20. The control system of claim 19, wherein
the crop state classification logic is configured to:
  identify a plurality of areas in the path; and
  for each respective area of the plurality of areas,
    receive image data of the crop plants in the respective area;
    apply a geometric classifier to the image data; and
    generate a corresponding height metric representing a height of the crop plants above a surface of the field on the respective area;
    compare the corresponding height metric to the threshold:
    classify the respective area as standing crop based on a determination that the corresponding height metric is above the threshold;
    classify the respective area as crop stubble based on a determination that the corresponding height metric is below the threshold and that the given area resides within the region; and
    classify the respective area as downed crop based on a determination that the corresponding height metric is below the threshold and the respective area does not reside within the region; and
the control logic is configured to control the controllable subsystem of the agricultural harvesting machine corresponding to each respective area, of the plurality of areas, based on the classification of the respective area.

* * * * *